United States Patent

[11] 3,596,430

| [72] | Inventor | Laurence P. Parish |
| | | RN No. 2, Gettysburg, Pa. 17325 |
| [21] | Appl. No. | 782,230 |
| [22] | Filed | Dec. 9, 1968 |
| [45] | Patented | Aug. 3, 1971 |

[54] AUTOMATIC MILK PACKAGING MACHINE
6 Claims, 6 Drawing Figs.

[52] U.S. Cl. .................................................. 53/67,
53/170, 53/390, 206/65
[51] Int. Cl. ........................................................ B65b 57/02,
B65b 67/12
[50] Field of Search .......................................... 53/67, 170,
390, 281

[56] References Cited
UNITED STATES PATENTS

| 3,029,574 | 4/1962 | Anderson | 53/281 |
| 3,427,646 | 2/1969 | Scholle | 53/281 |

Primary Examiner—Travis S. McGehee
Attorney—John J. Byrne

ABSTRACT: A machine for rapidly delivering to a filling apparatus and the removal therefrom, polyethylene bags having a relatively rigid spout fitting attached thereto, comprising a carrier to which the bags are attached, a conveyor system for moving said carrier to a discharge station and a discharge assistant for sequentially delivering the bags to said filling apparatus.

PATENTED AUG 3 1971
3,596,430
SHEET 1 OF 2
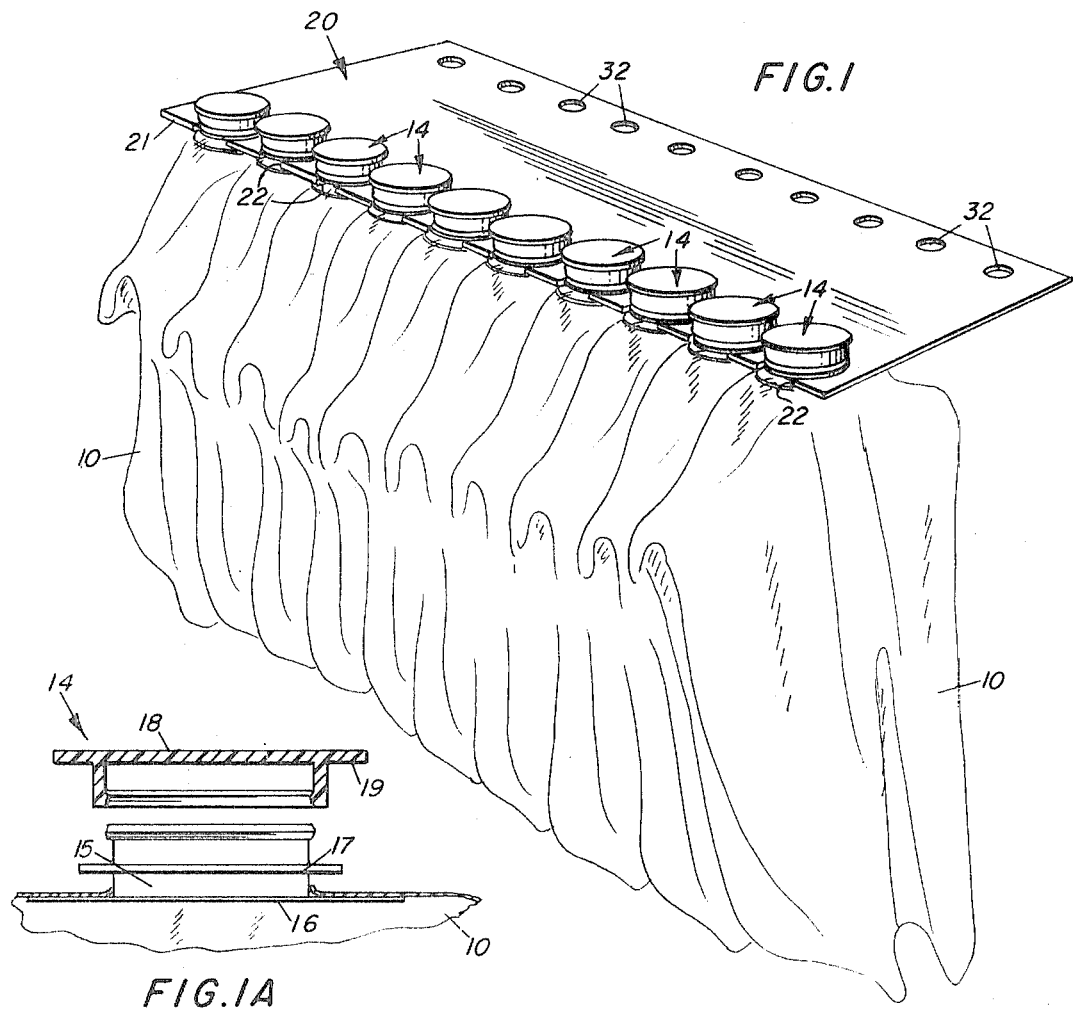
FIG.1
FIG.1A
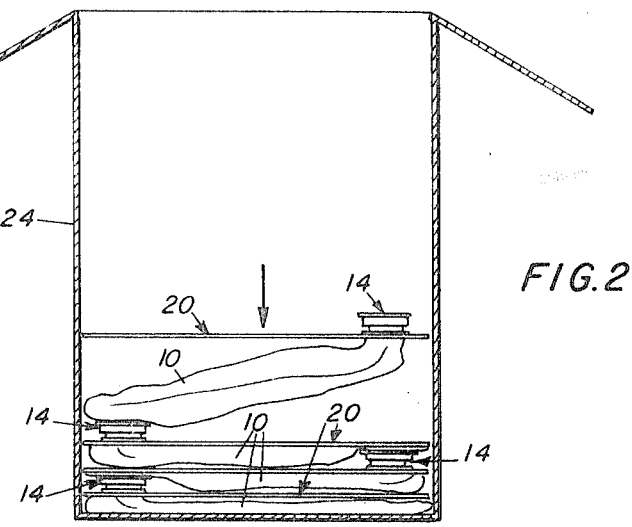
FIG.2
INVENTOR
LAURENCE P. PARISH
BY Robillard and Byrne
ATTORNEYS

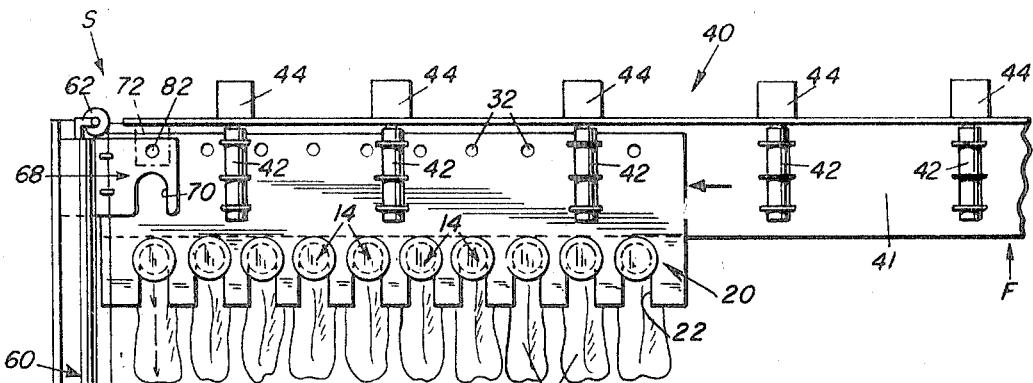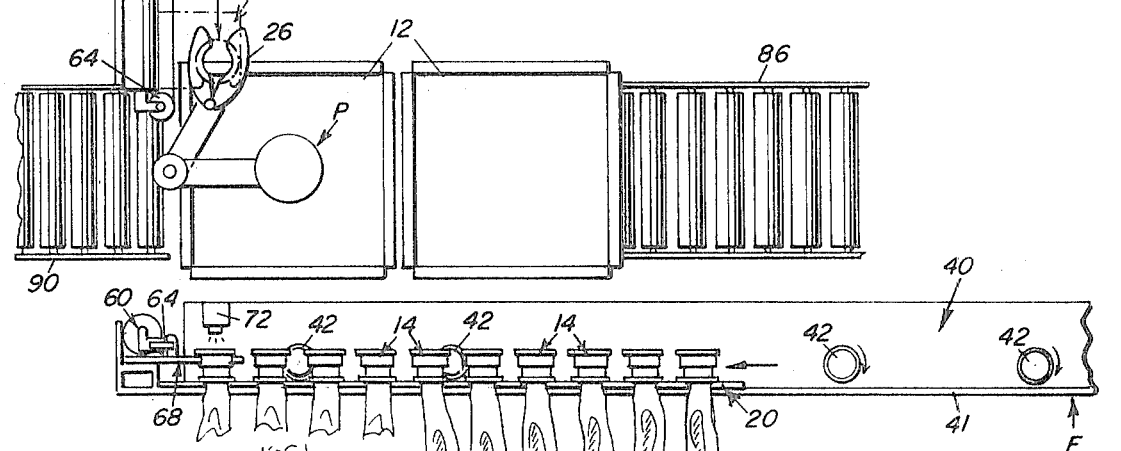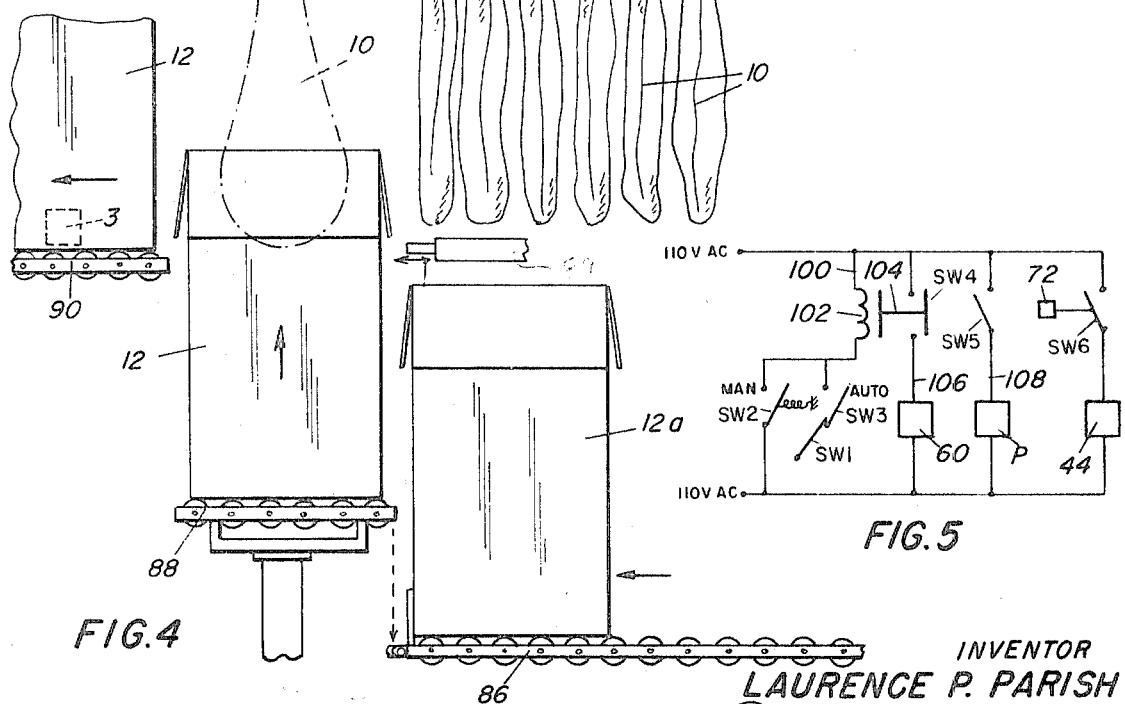

AUTOMATIC MILK PACKAGING MACHINE

There has been increasing use in the commercial packaging arts of the combination including impermeable polyethylene bags within corrugated containers. In the milk industry in particular, this type of container has found wide acceptance for the distribution of milk in restaurant-type operations. This type of container is exceptionally useful in any environment where large volumes of liquid are involved and it is desirable to use disposable packages.

The dairy industry has made considerable advancements in equipment for filling containers of this type. Prior to this invention, the rapidity of packaging was limited primarily by the mode in which the polyethylene containers were delivered to the liquid dispensing nozzle. It is, therefore, a primary objective of this invention to provide a delivering system which permits the rapid and orderly delivery of polyethylene containers to a dispensing or filler station.

Another objective of this invention is to provide means by which the filled bag and its corrugated container are expeditiously removed from the area of the filler machine. Further, through the use of this invention, there is a manpower saving, coupled with an increase of efficiency and sanitation.

Another important objective of this invention is to provide a carrier for polyethylene bags of the type described which carriers are readily fed and transferred by a conveying system.

A still further objective of this invention is to provide a conveyor system which efficiently transfers a bag carrier to a point where individual polyethylene bags are ejected from the carrier and moved to a filler station.

Another important objective of this invention is to provide an inexpensive carrier for packaging polyethylene bags of a type to which relatively rigid plug members have been attached.

These and other objectives of the invention will become more apparent to those skilled in the art by reference to the following detailed description when viewed in light of the accompanying drawings wherein:

FIG. 1 is a perspective view of a carrier with a plurality of polyethylene bags secured thereto, FIG. 1a is a cross section of the plug member, FIG. 2 is a diagrammatic side view illustrating a packaging system for carriers and bags of the type shown in FIG. 1, FIG. 3 is a diagrammatic top plan view of a conveyor system, FIG. 4 is a side elevation thereof, and FIG. 5 is a schematic of several of the principal electrical components of the circuitry.

Referring now to the drawings wherein like numerals indicate like parts, the numeral 10 indicates polyethylene bags of the type utilized with corrugated containers 12. In packaging arrangements of this type, the bags 10 provide an inexpensive container impermeable to most liquids while the containers 12 give the bag 10 a support, a desirable cover protecting the bag from puncture, and a confining chamber for preventing the bag from expanding beyond its limits of safety.

As seen in FIGS. 1 and 1a, the bags (prior to being filled) are equipped with plugs 14 through which the bag is filled and which later act as a fitting for a dispensing nozzle. The plugs are cylindrical at 15 and flanged at 16 and 17. As seen in FIG. 1, the plugs are closed by covers 18 for sanitary reasons. As will be understood by those skilled in the art, the covers 18 will be removed prior to filling and then replaced. In lieu of covers 18, the bags 10 are oftentimes enclosed with a dispensing spout of known type and design. These spouts are plugged at their dispensing end and have a fitting in engagement with the filler plugs. Although such spouts are oftentimes used, for purposes of this invention, they are the equivalent of covers 18. The covers (or spouts) 18 have an outwardly extending flange 19 for purposes hereinafter described.

One principal drawback facing those in the prior art was the difficulty of handling the polyethylene bags in an orderly and efficient manner. Here a carrier member 20 is provided to which a plurality of bags 10 can be secured in a systematic fashion. The carrier 20 is shown best in FIG. 1. Each carrier is formed along an edge 21 thereof with grooves 22 each of which are dimensioned to closely engage the cylindrical portions 15 of the plug members. The lateral dimensions of the grooves are less than the diameters of flange 17. The carriers 20 act as a magazine for a number of bags and provide the means by which the bags can be packaged and shipped as disclosed in FIG. 2. The bags 10 are mounted to their carriers 20 and layered in the box 24 in the manner shown. For maximum compactness, alternate carriers are at opposite ends of the box 24.

The invention includes apparatus for delivering the polyethylene bags 10 to a filler or catcher yoke 26 of a filler station P. The filler station P is of a type known to the art. For example, equipment marketed by the Weyerhaeuser Corporation as a Volumetric Filling Machine, Model F are suitable for these purposes. Such machines include means for supporting the plug while the cover or spout is removed, locating the open plug below a dispensing nozzle and, after filling, replacing the cover or spout. Yoke 26 is part of such a machine.

The carriers 20, after removal from boxes 24 are sequentially fed to a conveyor system generally indicated by the numeral 40. The system includes an elongated horizontally disposed support plate 41. Disposed above the support plate 41 at intervals along its length are a plurality of drums 42 which are driven by electric motors 44. When the leading end of a carrier 20 is placed on plate 41 at station F and moved into engagement with the endmost drum 42, the drum will move the carrier to the left (as viewed in FIG. 3) to sequential engagement with the series of drums. Note in FIG. 4 that the bags 10 hang below the plate 41 since the grooved edges 21 of the carriers extend beyond the edge of plate 41.

The drums 42 deliver the bags 10 sequentially to a discharge station S. Discharge station S includes means for individually removing the bags from their carrier and quickly delivering same to the filler apparatus. For these purposes, a pneumatic cylinder 60 is provided. A pulley 62 and a pulley 64 are mounted at either end of the cylinder and are circumscribed by a cable 66. A feeding fork 68 is affixed to cable 66 along its length. The fork has a forward facing groove 70 disposed just above the plane of plate 41. The groove 70 is of a lesser dimension than the flange 19 of caps 18. As described hereinafter, the cylinder is activated by a signal received from a switch in a conveyor system described hereinafter. The switch is activated by a filled package moving out of the filling position.

Upon activation of the cylinder 60, the feeding fork 68 will move rapidly forward so as to engage a plug 14 just below flange 19 and move the bag to the filler yoke 26. The yoke 26 is in the same horizontal plane as the carriers 20 and therefore, receives the plugs 14 just below the flange 17. While supported by the filler yoke 26, the plug 18 is removed and the polyethylene bag is transferred to a filler position P. Position P normally will include an automatic mechanism (not shown) for removing the plug or spout member 18 prior to the filling operation and thereafter replacing same.

Returning now to the carriers 20, it can be seen that a plurality of apertures 32 are formed therein immediately behind each of the grooves 22. An electric eye 72 is disposed above the retracted position of fork 68. The fork 68 has an aperture 82 therethrough. When aperture 82 in the slide fork is aligned with one of the apertures 32 in the carrier, a stop signal is sent to the drive drum motors 44 to stop the carrier 20 in proper position for the fork 68. When the slide fork feeds a bag to the filler machine, the light is broken. When the slide fork is returned, the drive drum circuitry is closed and a new bag is fed into position.

The scope of the invention can best be understood if the movement of the polyethylene bags is traced from their place of manufacture. First, at the manufacturing plant, a bag is manually inserted into each of the grooves 22 of the carriers 20. The bags are then packaged as previously described and shown in FIG. 2. The bags thus packaged are delivered to a feed station F. At station F the topmost carrier 20, with the bags attached is removed from the packaging box 24 and fed into the conveyor system 40 where the carriers are urged toward the feeding fork 38 by way of the rotating drum members 42. When one of the openings 32 aligns itself with the aperture 82 of the feeding fork, a switch is closed causing the drums to stop rotating. At this time one of the plugs 14 is directly in front of fork 68. As will be more fully understood hereinafter, the pneumatic cylinder 60 is activated upon receiving a signal that a filled container has departed from the filling station P. Upon activation of cylinder 60, the transfer fork 68 moves a bag to filler yoke 26. At this time the beam of electric eye 72 is interrupted and the drive drums are again activated after a short built-in time delay to permit the return of the fork to sequentially move another of the apertures 32 below the aperture 82 of the feeding fork. The pneumatic cylinder 60 is cycled in conventional fashion to return the fork 68 to its initial position after delivering a bag to yoke 26.

Upon the bag moving to position P, the filling begins upon actuation by the return stroke of transfer fork. Concurrently, a box 12 is moved into surrounding relationship with the bag by virtue of a rising conveyor portion 86. The conveyor rises at a controlled speed which causes the bag to fill with the minimum number of wrinkles. In its lower position, the conveyor 86 receives a box 12 from the conveyor 88. After filling, the box 12 is removed from the portion 86 and transferred to a point of further handling via the elevated conveyor portion 90. The basic switching controls can best be understood by the simplified schematic of FIG. 5. As can be seen, the circuitry is connected to a 110-volt power source. Across this source is a first line having a coil 102. In series with the coil is a selector switch SW 1. If the selector switch is placed at manual, the filling sequence is initiated by the spring-biased normally open switch SW 2. If the selector switch is at automatic, the filling sequence is initiated by a closing of SW 3 which is disposed on conveyor portion 90 and which senses that a filled container has departed from the conveyor portion 88.

Upon the closure of either SW 2 or SW 3, the coil 102 is energized which draws core 104 in a direction to close the normally open switch SW 4 of line 106. SW 4 activates the pneumatic cylinder 60 and the transfer fork 68. A switch SW 5 in a line 107 (not shown mechanically) is disposed at a convenient location to sense the return of the fork 68 to its initial position and thereby activate the filling machine circuitry. This circuitry is identified in its entirely by the numeral 108.

SW 6 is normally open and is disposed in line 109 with the drum motors 44. The power to the drive drums 44 when the normally open SW 6 closes line 109 via the electric eye 72. As mentioned previously, the electric eye device is of a "hold-closed" type to give a sufficient time delay to permit the fork to retract prior to the time carrier 20 begins moving again.

As diagrammatically shown in FIG. 4, a gate 87, spring-urged to its blocking position, prevents the endmost box 12 from moving into conveyor section 88 until section 88 returns to its lowermost position. Conveyor 86 has driven rollers to urge the boxes toward section 88. Shown diagrammatically is a pusher element 89 for moving a filled container 12 from the section 88 to section 90 prior to section 88 being retracted (lowered).

The circuitry for controlling the conveyor sequencing can be arranged in several ways all well within the capability of those skilled in the art. The electric circuitry and the exact location of the switches for establishing the described sequence of steps if also well within the skill of the average electrician and, therefore, has not been disclosed. However, it should also be understood that in such circuitry, provision should be made to permit manual sequencing when desire.

In a general manner, while there has been disclosed an effective and efficient embodiment of the invention, it should be well understood that the invention is not limited to such embodiment as there might be changes made in the arrangement, disposition, and form of the parts without departing from the principle of the present invention as comprehended within the scope of the accompanying claims.

I claim:
1. An apparatus for the sequential delivery of flexible bags to a filler device, said bags having relatively rigid plug members and being mounted on carriers receiving said plug members wherein the improvement comprises
   a first member supporting said carrier in a generally horizontal plane with the bags depending downwardly therefrom,
   a feeder station along said member for receiving said carrier,
   a discharge station along said member and spaced from said feeder station,
   power means associated with said member moving said carriers from said feeder station to said discharge station,
   discharge means located at said discharge station for individually removing said bags from said carrier to said filler device and
   control means actuating said discharge means when one of said plug members is in the path of said discharge means.
2. The apparatus of claim 1 wherein
   a reception fork is located in the path of movement of said discharge means and removes said bag from said discharge means,
   means to deliver a relatively rigid box to a position below the bag at said filler device,
   second means to move said box into surrounding relationship with said bag during the filling operation and
   third means to remove said box and bag from the vicinity of said filler device after the filling operation thereof.
3. The invention of claim 1 wherein said first member is an elongated plate and said power means are rotatable members disposed over said plate and in frictional engagement with carriers disposed on said plate.
4. The invention of claim 1 wherein said control means is comprised of an alignment means having a fixed relationship with each of said grooves and detection means to determine the location of said alignment means.
5. The invention of claim 1 wherein said discharge means is a power-operated fork adapted to engage said plugs.
6. The invention of claim 5 wherein said control means includes a second alignment means associated with said fork.